United States Patent [19]

Reuben

[11] Patent Number: 4,856,654
[45] Date of Patent: Aug. 15, 1989

[54] PACKAGE OF AUTOMOBILE MATS WITH MOUNTING PADS FOR MOUNTING MATS ON AN AUTOMOBILE CARPET

[75] Inventor: Harold Reuben, Akron, Ohio

[73] Assignee: Akro Corporation, Canton, Ohio

[21] Appl. No.: 199,024

[22] Filed: May 26, 1988

[51] Int. Cl.$^4$ .................. B65D 21/00; B32B 3/06; B60J 9/00

[52] U.S. Cl. .................. 206/449; 428/40; 428/85; 428/100

[58] Field of Search .................. 428/40, 85, 100; 206/449, DIG. 8

[56] References Cited

U.S. PATENT DOCUMENTS

| | | | |
|---|---|---|---|
| 4,290,174 | 9/1981 | Kalleberg | 428/40 X |
| 4,470,857 | 9/1984 | Casalou | 428/100 X |
| 4,481,240 | 11/1984 | Roth | 428/100 X |
| 4,673,603 | 6/1987 | Roth | 428/85 |
| 4,748,063 | 5/1988 | Reuben | 428/78 |

Primary Examiner—Allen M. Ostrager
Attorney, Agent, or Firm—Bell, Seltzer, Park & Gibson

[57] ABSTRACT

A package includes a pair of car mats which are positioned together in overlying relationship to each other by means engaging both car mats. Each of the mats includes outwardly extending spaced apart projections which are adapted to maintain the car mats in a placed relationship when positioned on top of the carpet of an automobile. A pair of relatively small pads are connected alongside the mats and adapted for further aiding in maintaining the car mats in a desired placed relationship when positioned on the carpet of an automobile. Each pad includes outwardly extending spaced apart projections on one side and an adhesive layer and a release cover applied to the other side so that upon removal of the release covers the pads can be releasably secured to an automobile carpet, wherein the projections of the mats engage the projections of the pads to ensure maintenance of the mat in a desired placed location.

13 Claims, 2 Drawing Sheets

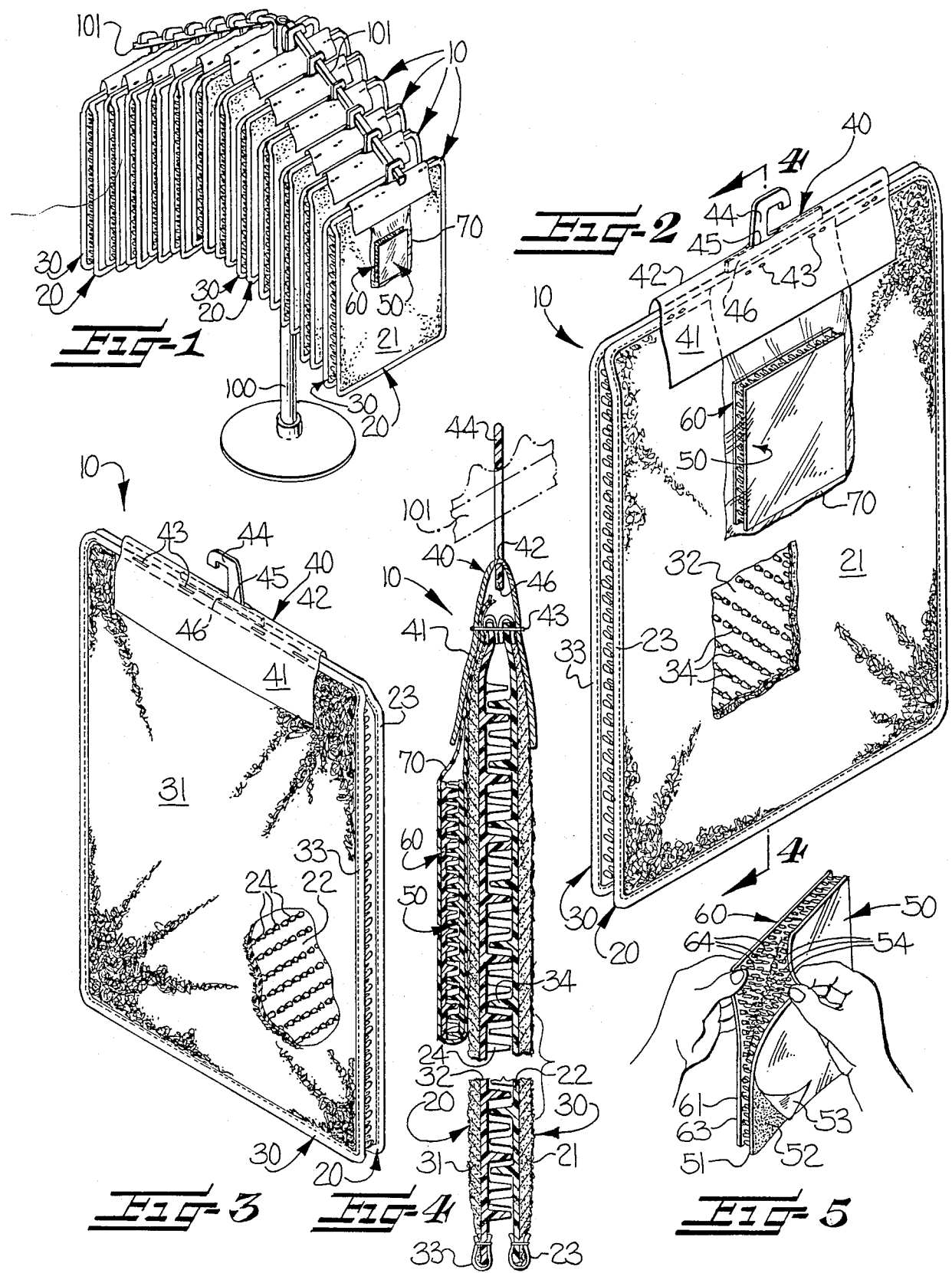

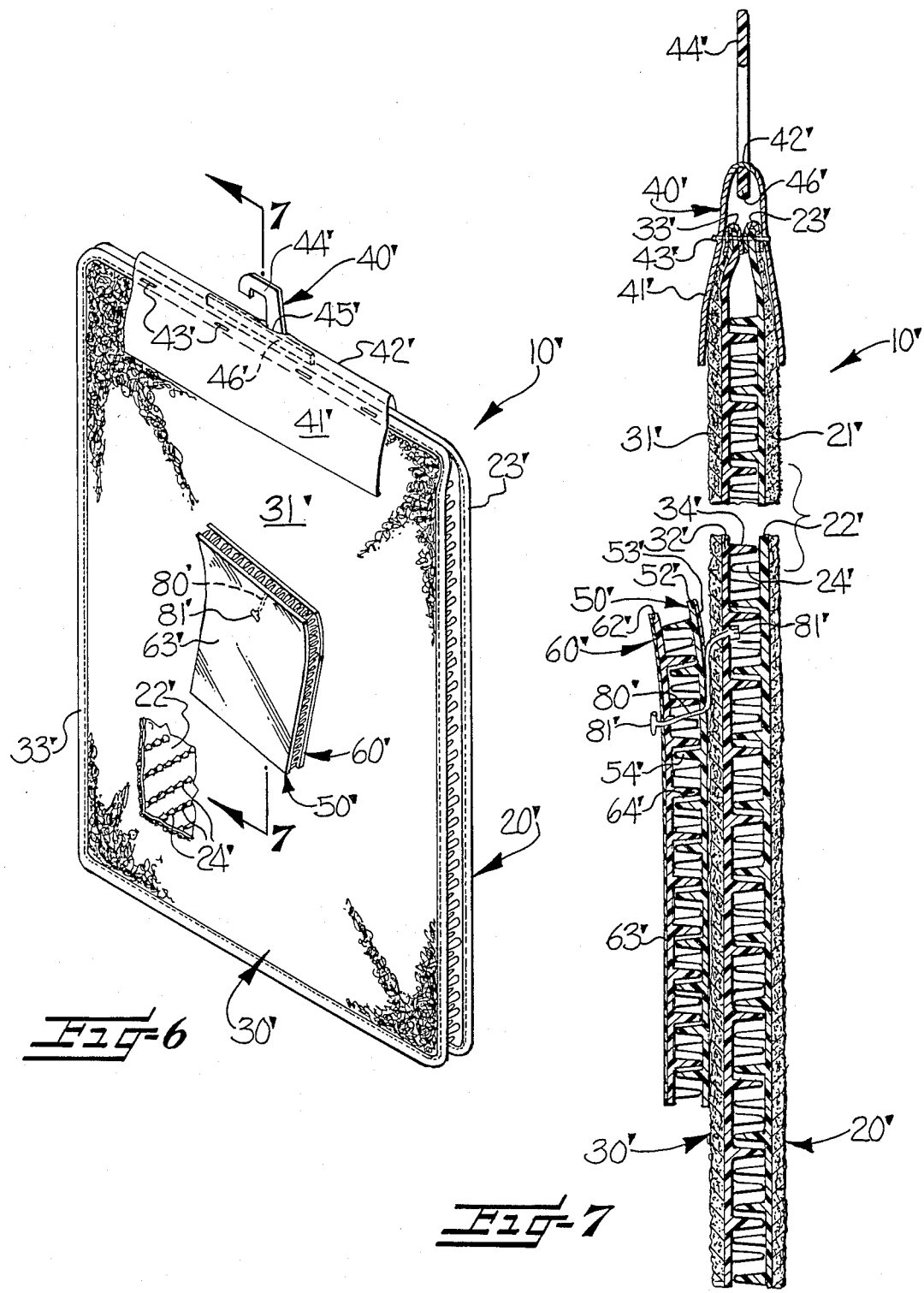

4,856,654

PACKAGE OF AUTOMOBILE MATS WITH MOUNTING PADS FOR MOUNTING MATS ON AN AUTOMOBILE CARPET

FIELD OF THE INVENTION

This invention relates to the packaging of a pair of car mats and more particularly to the packaging of car mats having additional pad means connected alongside the car mats which further aide in maintaining the car mats in a desired placed relationship when the car mats are positioned on the carpet of an automobile.

BACKGROUND OF THE INVENTION

In related copending application Ser. No. 99,069, filed Sept. 21, 1987, now U.S. Pat. No. 4,748,063, small pad means having integrally formed upstanding projections was disclosed as being suitably attached as a pre-market item to the face of an automobile carpet during its manufacture for purposes of cooperating in intermeshing relationship with an overlying car mat having downwardly extending projections so as to prevent shifting of the car mat relative to the underlying carpet and ensure maintenance of the car mat in its desired placed relationship overlying the automobile carpet. In the present invention, modification of the small pad means so that the pad means can be releasably secured to an automobile carpet has permitted the pad means to be supplied together with a car mat as an after-market feature directed to the wholesale and retail market selling new or replacement parts.

However, although the car mats and pad means are separate pieces, they are associated together in use and both should be shipped and displayed within the retail market as a unified package to prevent subsequent separation and possible loss of either the car mats or pad means. Also, not only is it customary to package pairs of mats corresponding to the driver's and passenger's sides of an automobile, but the pair of mats should be displayed so that consumers readily can determine whether the mats are adaptable in color and design to a chosen automobile interior. Thus, the mats must be packaged where any fibrous body portion can be inspected readily by a consumer. In addition, a consumer must readily determine that the car mats are purchased in association with pad means.

With the foregoing in mind, it is an object of this invention to provide for the retail and wholesale market a package of a pair of car mats, and pad means associated with the car mats for aiding in maintaining the car mats in a desired placed relationship when positioned on the carpet of an automobile, and wherein the car mats and pad means are packaged together to prevent separation from each other.

It is another object of this invention to provide for the retail and wholesale market a package of a pair of car mats, and pad means associated with the car mats for aiding in maintaining the car mats in a desired placed relationship when positioned on the carpet of an automobile, and wherein the car mats and pad means are packaged together so that during display of the package, the fibrous body portion of the car mats can be readily inspected by a consumer.

It is still another object of this invention to provide for the retail and wholesale market a package of a pair of car mats, and means associated with the car mats for aiding in maintaining the car mats in a desired placed relationship when positioned on the carpet of an automobile, and wherein the car mats and pad means are packaged together so that a consumer can readily determine that the car mats are purchased in association with the pad means.

SUMMARY OF THE INVENTION

In accordance with the present invention, a package includes a pair of car mats, and means engaging the pair of car mats and serving for positioning the car mats together in overlying relationship to each other. Each of the mats comprises a fibrous body portion and a backing secured to the fibrous body portion and having a plurality of outwardly extending integrally formed spaced apart projections adapted for maintaining the car mats in a placed relationship when positioned on top of the carpet in an automobile. Pad means is connected alongside the pair of car mats and adapted for further aiding in maintaining the car mats in a desired placed relationship when releasably secured and positioned on the carpet of an automobile. The pad means comprises a pair of relatively small pads of elastomeric material each having a unitary group of integrally formed spaced apart projections extending outwardly from one side of the pad. A layer of pressure sensitive adhesive is applied on the opposing side of each of the elastomeric pads for releasably securing the pads to an automobile carpet so that when applied thereon, the pad projections engage the car mat projections and maintain the mats in a desired placed relationship to an automobile carpet. A release cover is releasably secured to each layer of pressure sensitive adhesive to protect and maintain the tackiness of the adhesive layer prior to releasable securement of an automobile carpet.

In the preferred embodiment, the pair of car mats are packaged with the backings of each car mat opposing one another so that the integrally formed spaced apart projections outwardly extending from the backings of one car mat are engaged in intermeshing relationship with the projections of the other mat. The pads are positioned in opposing relationship to one another so that the unitary group of integrally formed spaced apart projections extending outwardly from one pad are engaged in intermeshing relationship with the projections of the other pad. To maintain the pads alongside the pair of car mats, the pair of pads may be positioned within a bag formed from flexible plastic film material and the bag connected alongside the car pads. In an alternative embodiment, the pads are connected by a flexible, narrow strand which passes through the pads and at least one of the car mats.

BRIEF DESCRIPTION OF THE DRAWINGS

The foregoing and other objects, features and advantages of the present invention will become apparent from the following detailed description of the preferred embodiment of the invention, and from the drawings in which:

FIG. 1 is an isometric view of a number of packages according to a first embodiment of the present invention which are suspendingly displayed from a horizontal support.

FIG. 2 is an isometric view of the package embodiment of FIG. 1 showing in detail the pads positioned within a plastic bag and showing in partial sectional cut-away the outwardly extending projections of one of the car mats.

FIG. 3 is an isometric view of the package looking in the direction opposite to that of FIG. 2 and showing in partial sectional cut-away the outwardly extending projections of the other car mat.

FIG. 4 is a sectional view of the package taken along line 4—4 of FIG. 2 and showing in detail the intermeshing relationship of projections from one mat with those of the other and also showing intermeshing among projections of the pads contained within the plastic bag.

FIG. 5 is an isometric view of the two partially separated intermeshing pads showing the applied release cover partially removed therefrom.

FIG. 6 is an isometric view of a second embodiment of the invention showing a pair of car pads connected alongside the car mats by means of a flexible, narrow strand.

FIG. 7 is a sectional view of the second embodiment take along line 7—7 of FIG. 7.

DETAILED DESCRIPTION

Referring now to the drawings and more particularly to FIG. 1, a multiplicity of packages 10 according to a first preferred embodiment of the present invention is shown in FIG. 1 in suspending display on a conventional point-of-purchase display stand 100 having substantially horizontal supports 101. Referring also to FIG. 2, the package 10 includes a pair of car mats 20, 30 positioned together in overlying relationship to each other by means of a display hanger 40 which extends transversely of the pair of car mats and engages corresponding end portions of the mats for maintaining the same together. The display hanger 40 includes an elongate, flexible member 41 formed from a material such as heavy paper or cardboard which is folded longitudinally along a center fold line 42 so that folded portions overlie end portions of the mats 20, 30. Suitable fasteners such as staples 43 secure the folded member 61 and mats 20, 30 together. A hook 44, for facilitating suspending display of the pair of car mats 20, 30 from a horizontal support, extends through a cut-out 45 located on the center fold line 42. The hook 44 includes a base section 46 which engages the center fold line 42 to support the hook 44 thereat.

Connected alongside the pair of car mats 20, 30 are a pair of relatively small pads 50, 60, which as will later be explained in detail, aid in maintaining the car mats 20, 30 in a desired placed relationship when each of the mats is placed in a desired placed relationship upon an automobile carpet (not shown). As best seen in FIGS. 2 and 4, the pair of pads 50, 60 are positioned within a bag 70 formed from a flexible plastic film material which is then secured to the display hanger 40 by fasteners 43. The plastic bag is advantageous since it provides a simple and efficient means to connect the pads 50, 60 alongside the mats 20, 30 while minimizing the chance the pads could be separated from the mats.

Referring now to FIGS. 2-4, each carpet mat 20, 30 is shown as being of conventional or other construction and includes for each respective mat a fibrous face 21, 31 and a backing 22, 32 of elastomeric or rubber-like material. The facing is of conventional construction, e.g. knit, woven or non-woven material and defines the upper fibrous side or face of a mat and is suitably secured on one side of the backing. Desirably, each mat 20, 30 covers substantially the entire upper surface of the backing 22, 32 and may be secured thereto by any suitable means, such as suitable stitching extending through piping 23, 33 (FIGS. 2 and 3) extending along and folded over the peripheral edges of the backing and the facing of the carpet pad. The opposing side of each mat 20, 30 includes a plurality of respective outwardly extending integrally formed spaced apart projections 24, 34 connected thereto and depending from the backside thereof (FIGS. 2 and 3). Conventionally, the projections 24, 34 are of tapered or frusto conical shape and are adapted to penetrate into an underlying automobile carpet (not shown) for aiding in preventing shifting of the mats relative to the automobile carpet. However, the amount of movement restraint which these projections alone can provide through simply engaging the carpet has not been found to be sufficient to practically anchor the pad against slipping. As will later be explained in detail, the projections 24, 34 are adapted for cooperating with a unitary group of integrally formed spaced apart projections which extend outwardly from one side of the pads 50, 60 so that when the pads are releasably secured to an automobile carpet, the car mats are maintained in a desired placed relationship to the automobile carpet when placed in overlying relationship thereto.

To facilitate maintenance of the car mats 20, 30 in overlying relationship to each other when packaged, the mats are packaged with the fibrous faces 21, 31 oriented outwardly and in directions opposite to one another. The integrally formed spaced apart projections outwardly extending from the backing of one of the car mats are engaged in intermeshing relationship with the projections of the other car mat (FIG. 4). Not only does this intermeshing of the packaged mat projections 24, 34 minimize slippage between the mats 20, 30, but the actual volume displaced by the mats s reduced as compared when the mats are packaged so that the projections of one mat engage the fibrous face of the other mat. This lessened volume allows a greater number of packages 10 to be suspended on a given length of horizontal support 101 (FIG. 1). In addition, by packaging the mats 20, 30 with the fibrous faces 21, 31 outwardly directed, consumers can more readily inspect the mats to determine whether the mats are suitable for use in a chosen automobile.

Referring now to FIGS. 4 and 5, each pad 50, 60 each comprises respective backings 51, 61 molded of elastomeric or rubber-like material which may be similar to the material of which the car mat backings 22, 32 are formed. As illustrated the size of each of the pads 50, 60 is substantially less than the overall size of the car mats 20, 30 so that each pad can be connected to the face of the automobile carpet in at least one localized area of the carpet. The underside of each pad backing 51, 61 includes thereon a respective pressure sensitive adhesive layer 52, 62 for releasably connecting each of the pads 50, 60 to an automobile carpet (now shown). Following installation, should any of the pads 50, 60 become worn or damaged, the worn pad can be peeled off the automobile carpet 14 and a replacement applied thereto.

As best seen in FIG. 5, respective release covers 53, 63 are releasably secured to the pressure sensitive adhesive layer 52, 62 to protect and maintain the tackiness of the adhesive layer 52, 62 before removable connection of pads 50, 60 to an automobile carpet. In use, the release covers 53, 63 can be peeled away from the pads 50, 60 so as to expose the pressure sensitive adhesive layers 52, 62 (FIG. 5). Once the adhesive layers 52, 62 are exposed, the pads 50, 60 can be applied to an automobile carpet.

Each of the pads 50, 60 further comprises a unitary group of outwardly extending integrally formed spaced apart frustoconically shaped projections 54, 64 extending outwardly from the faces of the backings and thus extending upwardly from the face of the automobile carpet when the pads 50, 60 are releasably secured to an automobile carpet. When the car mats 20, 30 are positioned upon an automobile carpet, some of the projections 24, 34 depending from the mats 20, 30 are positioned in intermeshing relationship with the unitary group of upstanding projections 54, 64 of the pads and serve to ensure maintenance of the carpet pads in their desired placed relationship overlying the automobile carpet.

As heretofore noted, the pair of pads 50, 60 is packaged with the pair of car mats 20, 30 by placing the mats 20, 30 in a bag 70 formed from a flexible plastic material and connecting the bag alongside the pads. Preferably the bag 70 is formed of clear plastic to enable the consumer to readily see that the mats 20, 30 are sold having associated pads 50, 60. In the preferred illustrated embodiment shown in FIGS. 1–4, the pads 50, 60 are packaged so that the integrally formed projections of one pad engage the projections of the other pad. As is similar with the packaged car mats 20, 30, the interengagement of the pad projections 54, 64 minimizes space restrictions. When the pads are to be used, they may be easily separated from each other and respective release covers removed (FIG. 5).

Referring now to FIGS. 6 and 7, a second embodiment of the invention is illustrated where for purposes of clarity and understanding the prime notation is attached to reference numerals to distinguish between first and second embodiments. The second embodiment is illustrated where the pair of car pads 50', 60' are shown connected alongside the pair of car mats 20', 30'. A flexible, narrow strand 80' made from a suitable plastic material such as conventionally used for price tagging or other numerous merchandising applications passes through the pads and one of the mats. The strand 80' includes end tabs 81' which prevent disconnection of the strand 80' from the car mats 20', 30' and pads 50', 60'. By packaging the pads 50', 60' in this manner, consumers not only can visually inspect the pads, but the pads can be more easily physically handled for consumer inspection.

The foregoing embodiments are to be considered illustrative rather than restrictive of the invention and those modifications which come within the meaning and range of equivalents of the claims to be included therein.

That which is claimed is:

1. A package comprising a pair of car mats, means engaging said pair of car mats and serving for positioning the car mats together in overlying relationship to each other, each of said mats comprising a fibrous body portion and a backing secured to said fibrous body portion and having a plurality of outwardly extending integrally formed spaced apart projections adapted for maintaining the car mats in a placed relationship when positioned on top of the carpet in an automobile, and pad means connected alongside said pair of car mats for further aiding in maintaining the car mats in a desired placed relationship when positioned on the carpet of an automobile, said pad means comprising a pair of relatively small pads of elastomeric material each having a unitary group of integrally formed spaced apart projections extending outwardly from one side of the pad and adapted for being positioned in intermeshing relationship with the projections extending from the back of one of said car mats, a layer of pressure sensitive adhesive on the opposing side of each of said elastomeric pads, and a release cover releasably secured to said layer of pressure sensitive adhesive to protect and maintain the tackiness of the adhesive layer for releasable securement to an automobile carpet.

2. The package as claimed in claim 1 wherein said pair of car mats are positioned so that the backings of each car mat oppose one another and wherein said integrally formed spaced apart projections outwardly extending from the backings of one car mat are engaged in intermeshing relationship with the projections of the other car mat.

3. The package as claimed in claim 1 wherein said pads are positioned in opposing relationship to one another so that the unitary group of integrally formed spaced apart projections extending outwardly from one pad are engaged in intermeshing relationship with the projections of the other pad.

4. The package as claimed in claim 1 including a bag formed from flexible plastic film material, and wherein said pair of pads are positioned within said bag, and means connecting said bag alongside said car mats.

5. The package as claimed in claim 1 including means interconnecting said pads to at least one of said car mats and comprising a flexible, narrow strand passing through said pads and at least one of said car mats, said strand including means on its opposite end for preventing disconnection of said strand from said car pads and car mats.

6. A package comprising a pair of car mats, means engaging said pair of car mats and serving for positioning the car mats together in overlying relationship to each other, and comprising a display hanger extending transversely of the pair of car mats and engaging corresponding end portions of the mats for maintaining the same together, said display hanger including hook means for facilitating suspending display of said pair of car mats from a suitable horizontal support, each of said mats comprising a fibrous body portion and a backing secured to said fibrous body portion and having a plurality of outwardly extending integrally formed spaced apart projections adapted for maintaining the car mats in a placed relationship when positioned on top of the carpet in an automobile, and pad means connected alongside said pair of car mats for further aiding in maintaining the car mats in a desired placed relationship when positioned on the carpet of an automobile, said pad means comprising a pair of relatively small pads of elastomeric material each having a unitary group of integrally formed spaced apart projections extending outwardly from one side of the pad and adapted for being positioned in intermeshing relationship with the projections extending from the back of one of said carpet mats, a layer of pressure sensitive adhesive on the opposing side of each of said elastomeric pads, and a release cover releasably secured to said layer of pressure sensitive adhesive to protect and maintain the tackiness of the adhesive layer for releasable securement to an automobile carpet.

7. The package as claimed in claim 6 wherein said pair of car mats are positioned so that the backings of each car mat oppose one another and said integrally formed spaced apart projections outwardly extending from the backings of one car mat are engaged in intermeshing relationship with the projections of the other mat.

8. The package as claimed in claim 6 wherein said pads are positioned in opposing relationship to one another so that the unitary group of integrally formed spaced apart projections extending outwardly from one pad are engaged in intermeshing relationship with the projections of the other pad.

9. The package as claimed in claim 6 including a bag formed from flexible plastic film material, and wherein said pair of pads are positioned within said bag, and means connecting said bag to said display hanger.

10. The package as claimed in claim 6 including means interconnecting said pads to at least one of car mats, and comprising a flexible, narrow strand passing through said pads and at least one of said car mats, said strand including means on its opposite end for preventing disconnection of said strand from said car pad and car mats.

11. A package comprising a pair of car mats, each of said car mats comprising a fibrous body portion and a backing secured to said fibrous body portion and having a plurality of outwardly extending integrally formed spaced apart projections adapted for maintaining the car mats in a placed relationship when positioned on top of the carpet in an automobile, means engaging said pair of car mats and serving for positioning the car mats together in overlying relationship to each other so that the backings of each car mat oppose one another and wherein said integrally formed spaced apart projections outwardly extending from the backings of each of the car mats are engaged in intermeshing relationship with one another, and pad means connected alongside said pair of car mats for further aiding in maintaining the car mats in a desired placed relationship when positioned on the carpet of an automobile, said pad means comprising a pair of relatively small pads of elastomeric material each having a unitary group of integrally formed spaced apart projections extending outwardly from one side of the pad and adapted for being positioned in intermeshing relationship with the projections extending from the back of one of said car mats, and wherein said pads are positioned in opposing relationship to one another so that the unitary group of integrally formed spaced apart projections extending outwardly from one pad are engaged in intermeshing relationship with the projections of the other pad, a layer of pressure sensitive adhesive on the opposing side of each of said elastomeric pads, and a release cover releasably secured to said layer of pressure sensitive adhesive to protect and maintain the tackiness of the adhesive layer for releasable securement to an automobile carpet.

12. The package as claimed in claim 11 including a bag formed from flexible plastic film material, and wherein said pair of pads are positioned within said bag and means connecting said bag to said display hanger.

13. The package as claimed in claim 11 including means interconnecting said pads to at least one of said car mats, and comprising a flexible, narrow strand passing through said pads and at least one of said car mats, said strand including means on its opposite end for preventing disconnection of said strand from said car pad and car mats.

* * * * *